United States Patent
Ahn

(10) Patent No.: US 9,835,163 B2
(45) Date of Patent: Dec. 5, 2017

(54) IMPELLER ASSEMBLY OF FLUID ROTARY MACHINE AND MANUFACTURING METHOD THEREOF

(71) Applicant: HANWHA TECHWIN CO.,LTD., Changwon-si (KR)

(72) Inventor: Jong Kee Ahn, Changwon (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 717 days.

(21) Appl. No.: 14/276,055

(22) Filed: May 13, 2014

(65) Prior Publication Data

US 2015/0044048 A1 Feb. 12, 2015

(30) Foreign Application Priority Data

Aug. 7, 2013 (KR) .......................... 10-2013-0093785

(51) Int. Cl.
| | |
|---|---|
| *F01D 5/14* | (2006.01) |
| *F04D 29/22* | (2006.01) |
| *B22F 5/10* | (2006.01) |
| *F04D 29/02* | (2006.01) |
| *F04D 29/28* | (2006.01) |

(52) U.S. Cl.
CPC ............ *F04D 29/2205* (2013.01); *B22F 5/10* (2013.01); *F04D 29/023* (2013.01); *F04D 29/2227* (2013.01); *F04D 29/284* (2013.01); *F01D 5/14* (2013.01); *F05D 2230/21* (2013.01); *F05D 2230/31* (2013.01); *Y02P 10/295* (2015.11); *Y10T 29/49336* (2015.01)

(58) Field of Classification Search
CPC .... F01D 5/14; F04D 29/2205; F04D 29/2227; F04D 29/284; B22F 5/10; F05D 2230/31
USPC .............................................. 416/179, 186 R
See application file for complete search history.

(56) References Cited

U.S. PATENT DOCUMENTS

| | | | | |
|---|---|---|---|---|
| 3,508,602 A | * | 4/1970 | Webb | ........................ B22C 9/04 164/361 |
| 4,322,200 A | * | 3/1982 | Stiegelmeier | ....... F04D 29/2222 416/184 |
| 6,146,094 A | * | 11/2000 | Obana | ................... F04D 29/023 415/200 |

(Continued)

FOREIGN PATENT DOCUMENTS

| | | |
|---|---|---|
| JP | 2002-227963 A | 8/2002 |
| JP | 2002-364588 A | 12/2002 |

(Continued)

*Primary Examiner* — Michael R Reid
*Assistant Examiner* — Christopher Ballman
(74) *Attorney, Agent, or Firm* — Sughrue Mion, PLLC

(57) ABSTRACT

Provided is a method of manufacturing an impeller assembly, the method including providing an impeller including: a rotary shaft; a base portion radially extending outward from the rotary shaft; and a plurality of blades extending radially outward from the rotary shaft and disposed on the base portion, each of the plurality of blades provided apart from one another in a circumferential direction around the rotary shaft; providing a mold in an area between the plurality of blades; and forming a shroud covering upper portions of the plurality of blades and an upper portion of the mold, wherein the forming the shroud comprises applying a melted metal on the upper portions of the plurality of blades and the upper portion of the mold.

14 Claims, 8 Drawing Sheets

(56) References Cited

U.S. PATENT DOCUMENTS

| | | | |
|---|---|---|---|
| 8,317,468 B2 * | 11/2012 | Vedsted | B22F 3/225 |
| | | | 415/208.2 |
| 8,408,873 B2 | 4/2013 | Iwasa et al. | |
| 8,426,766 B2 | 4/2013 | Tsukamoto et al. | |
| 2003/0072831 A1 * | 4/2003 | Poynor | B29C 45/76 |
| | | | 425/145 |
| 2010/0242280 A1 * | 9/2010 | Adachi | B29C 65/08 |
| | | | 29/889.7 |
| 2011/0286855 A1 * | 11/2011 | Cappuccini | B22F 3/15 |
| | | | 416/241 R |
| 2011/0318183 A1 | 12/2011 | Noronha et al. | |
| 2012/0263599 A1 * | 10/2012 | Sugimura | F04D 29/30 |
| | | | 416/223 A |
| 2013/0004316 A1 * | 1/2013 | Matwey | F01D 5/048 |
| | | | 416/198 A |
| 2013/0017067 A1 * | 1/2013 | Cantelli | B23K 15/006 |
| | | | 415/170.1 |
| 2013/0039769 A1 * | 2/2013 | Giannozzi | F04D 29/023 |
| | | | 416/186 R |
| 2013/0098061 A1 * | 4/2013 | Matwey | F01D 5/046 |
| | | | 60/785 |
| 2013/0195608 A1 * | 8/2013 | Gharaibah | B01D 45/14 |
| | | | 415/1 |
| 2013/0272883 A1 * | 10/2013 | Paeng | F04D 29/284 |
| | | | 416/188 |
| 2014/0093376 A1 * | 4/2014 | Giovannetti | B29C 37/0032 |
| | | | 416/181 |
| 2014/0127021 A1 * | 5/2014 | Chiovelli | F01D 5/12 |
| | | | 416/179 |

FOREIGN PATENT DOCUMENTS

| | | |
|---|---|---|
| JP | 2008-240584 A | 10/2008 |
| JP | 2009-090349 A | 4/2009 |

* cited by examiner

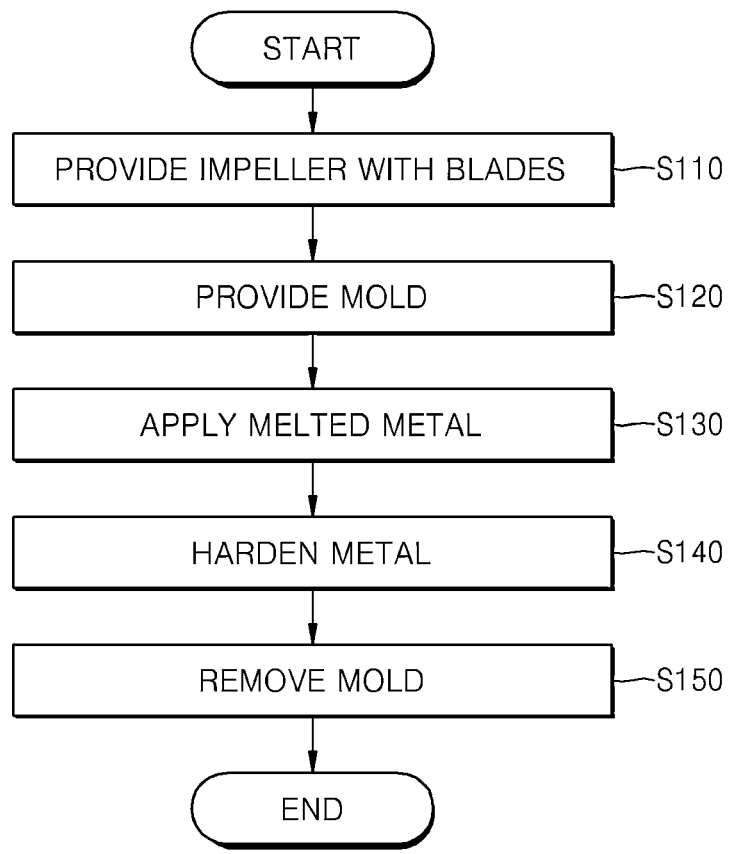
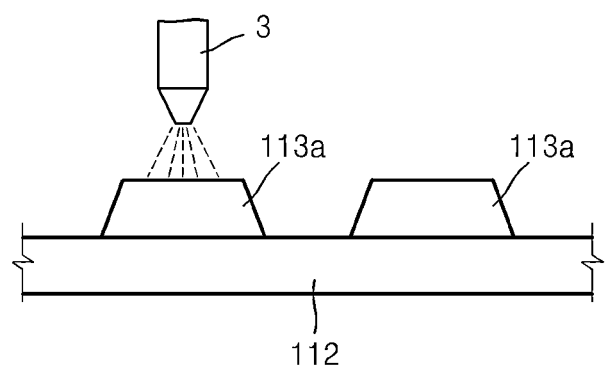

IMPELLER ASSEMBLY OF FLUID ROTARY MACHINE AND MANUFACTURING METHOD THEREOF

CROSS-REFERENCE TO RELATED APPLICATION

This application claims priority from Korean Patent Application No. 10-2013-0093785, filed on Aug. 7, 2013, in the Korean Intellectual Property Office, the disclosure of which is incorporated herein by reference in its entirety.

BACKGROUND

1. Field

Apparatuses and methods consistent with exemplary embodiments relate to an impeller assembly of a fluid rotary machine and a method of manufacturing the same, and more particularly, to an impeller assembly that is easy to manufacture and that has a stable structure and a method of manufacturing the same.

2. Description of the Related Art

Compressors or pumps used for compressing a fluid include an impeller as a rotary machine structure. The impeller is configured to deliver rotary motion energy to a fluid by increasing the pressure of the fluid. The impeller includes a plurality of blades that guide movement of the fluid and deliver energy to the fluid. A shroud disposed to cover the impeller forms a moving path of the fluid together with the plurality of blades.

As known in the related art, the shorter the distance between the plurality of blades and the shroud, the higher the efficiency of a compressor. Thus, there is a recent trend that an impeller and a shroud are joined to form an integral structure, thereby maximizing the efficiency of a compressor.

In a technique of manufacturing an impeller assembly by joining an impeller and a shroud, a process of fixedly joining the plurality of blades of the impeller and the shroud should be performed. To this end, a process such as a casting process, a brazing process, electronic-beam welding, etc. is used.

For example, Japanese Laid-open Patent Publication No. 2004-353608 discloses a technique of reinforcing joining of a shroud to an impeller by welding a shroud to the impeller, in which the impeller and the shroud are fixed to each other by contacting and welding the impeller and the shroud together.

However, if an impeller assembly is manufactured according to this method, it is difficult to manufacture the impeller assembly when the overall size of the impeller assembly increases. That is, when the overall size of the impeller assembly increases, the size and thickness of the shroud naturally also increase. In this case, however, input welding power is excessively generated to weld the thick shroud and the impeller together and thus the impeller and the shroud may excessively deform.

Although use of a thin shroud may be considered to minimize deformation in the welding process, the shroud cannot stably support blades of an impeller assembly when the shroud is designed to be thin, and the structural stability and the performance of the fluid machine may be deteriorated.

In the related art, an impeller assembly may also be manufactured using a casting process but different contraction characteristics due to different masses of portions thereof arise when a melted metal is hardened. In particular, a fillet portion of the impeller assembly excessively deforms, thereby preventing the outlines of three-dimensional (3D) blades from being precisely formed.

Alternatively, in the related art, an impeller assembly may be manufactured using a vacuum brazing process of uniting a base material and a filler material having a low melting point by melting the filler material without causing damage to the base material. However, in the vacuum brazing process, when a resultant structure is heated to a range of reaction temperatures and is then cooled, cooling rates of portions of the resultant structure are different due to a variation in the thickness thereof, thereby causing a fillet portion to deform to a great extent. Therefore, the impeller assembly cannot be used when the deformation is not in an allowable design range and cannot be applied to products used at high rotations per minute (RPM) since an adhesive strength of portions united using the brazing process is lower than that of portions united using the welding process.

When an impeller and a shroud are joined together by using both the welding process and the brazing process, a fillet portion at which the shroud and the impeller are united to each other may be manufactured using a brazing filler. In the related art, since the fillet portion is formed in a small size having a radius of about 0.8 mm, stress is intensively applied to the fillet portion. Accordingly, it is difficult to apply impeller assemblies manufactured using the methods described above to large-sized products.

Furthermore, a closed type impeller assembly may be manufactured by machining such as cutting, drilling, etc. However, when the overall size of an impeller assembly is small or the heights of blades are low, it is difficult to secure a working space into which processing equipment can be positioned.

SUMMARY

One or more exemplary embodiments provide an impeller assembly of a fluid rotary machine which maintains a stable structure even when the overall size of the impeller assembly increases, and a method of manufacturing the same.

One or more exemplary embodiments provide an impeller assembly that is simple and easy to manufacture, and a method of manufacturing the same.

One or more exemplary embodiments provide an impeller assembly of a fluid rotary machine, in which a shroud is formed by melting and applying a metal to form a stable combining structure of the shroud and blades, and a method of manufacturing the same.

According to an aspect of an exemplary embodiment, there is provided an impeller assembly of a fluid rotary machine including: a rotary shaft; a base portion radially extending outward from the rotary shaft; a plurality of blades extending radially outward from the rotary shaft, and disposed on the base portion, each of the plurality of blades provided apart from one another in a circumferential direction around the rotary shaft; and a shroud provided on radially outward portions of the plurality of blades, wherein the shroud is formed by melting a metal and applying the melted metal onto the radially outward portions of plurality of blades.

The melted metal may include a different chemical composition from a chemical composition of the metal.

Widths of the plurality of blades may decrease from a contacting portion of the plurality of blades and the base portion toward an end portion of the plurality of blades.

The end portion may be configured to contact the shroud.

Each of the plurality of blades may include a stacked plurality of layers.

The shroud may include a cladding layer.

The shroud may include at least two layers.

According to an aspect of another exemplary embodiment, there is provided a method of manufacturing an impeller assembly including: providing an impeller including: a rotary shaft; a base portion radially extending outward from the rotary shaft; and a plurality of blades extending radially outward from the rotary shaft and disposed on the base portion, each of the plurality of blades provided apart from one another in a circumferential direction around the rotary shaft; providing a mold in an area between the plurality of blades; and forming a shroud covering upper portions of the plurality of blades and an upper portion of the mold, wherein the forming the shroud comprises applying a melted metal on the upper portions of the plurality of blades and the upper portion of the mold.

The forming the shroud may include: supplying metal powder to the upper portions of the plurality of blades and the upper portion of the mold; and irradiating laser onto the metal powder to melt the metal powder.

The forming the shroud may include: melting a metal; applying the melted metal onto the upper portions of the plurality of blades and the upper portion of the mold; and hardening the applied metal.

The method may further include forming the shroud with at least two layers.

The providing the impeller may include performing three-dimensional (3D) printing the plurality of blades.

The performing 3D printing may include repeatedly stacking a plurality of layers on the base portion.

Widths of the plurality of blades may decrease from a contacting portion of the plurality of blades and the base portion toward an end portion of the plurality of blades.

The mold is provided between adjacent blades, and a width of the mold may increase from a contacting portion of the mold and the base portion toward an end portion of the mold.

The providing the mold between the plurality of blades may include filling spaces between adjacent blades with a ceramic material paste.

The providing the mold between the plurality of blades may further include hardening the mold after the mold is provided between the plurality of blades.

The providing the mold between the plurality of blades may include inserting a pre-manufactured mold having a shape corresponding to spaces between adjacent blades.

The method may further include removing the mold.

The removing the mold may include at least one of grinding the mold, delivering ultrasonic vibration to the mold, spraying high-pressure water onto the mold, and irradiating laser beams onto the mold.

BRIEF DESCRIPTION OF THE DRAWINGS

The above and/or other aspects will become apparent and more readily appreciated from the following description of exemplary embodiments, taken in conjunction with the accompanying drawings in which:

FIG. 5 is a schematic flowchart of a method of manufacturing an impeller assembly according to an exemplary embodiment;

FIG. 6 is a side view for schematically explaining preparing an impeller, which is included in the method of manufacturing an impeller assembly of FIG. 5, according to an exemplary embodiment;

DETAILED DESCRIPTION

Figure 1:
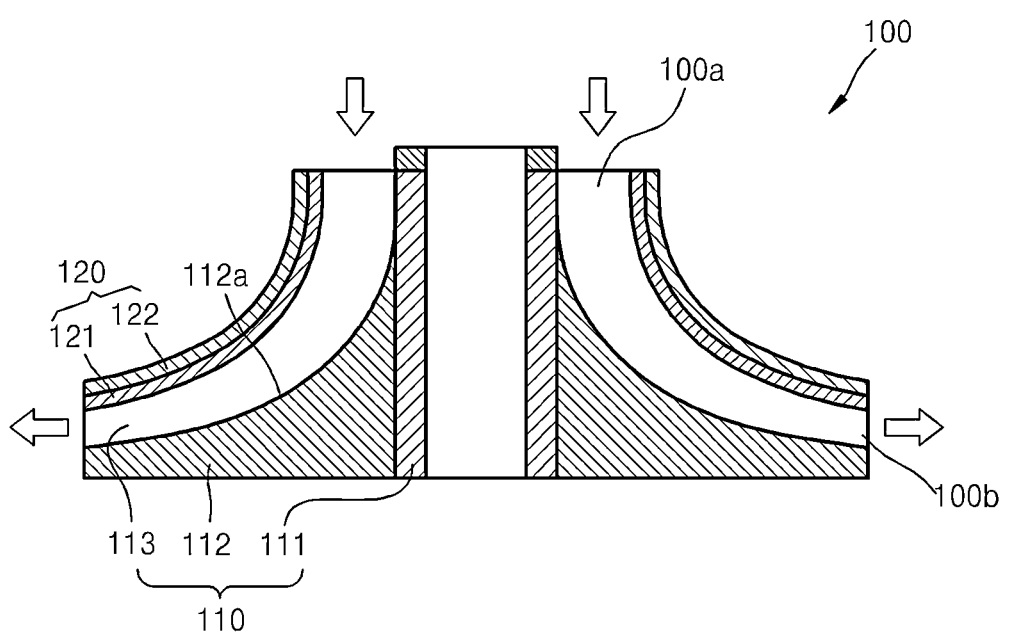
FIG. 1 is a schematic cross-sectional view of an impeller assembly according to an exemplary embodiment.

Reference will now be made in detail to the exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the inventive concept.

FIG. 1 is a schematic cross-sectional view of an impeller assembly 100 according to an exemplary embodiment.

Referring to FIG. 1, the impeller assembly 100 according to an exemplary embodiment includes an impeller 110 and a shroud 120.

The impeller assembly 100 may be used in a compressor but the exemplary embodiment is not limited thereto. That is, the impeller assembly 100 may be used in various types of rotary machines capable of changing the pressure and speed of a fluid by using a rotational movement of the impeller assembly 100. For example, the various types of rotary machines to which the impeller assembly 100 is applicable may include pumps, ventilators, etc.

Figure 2:
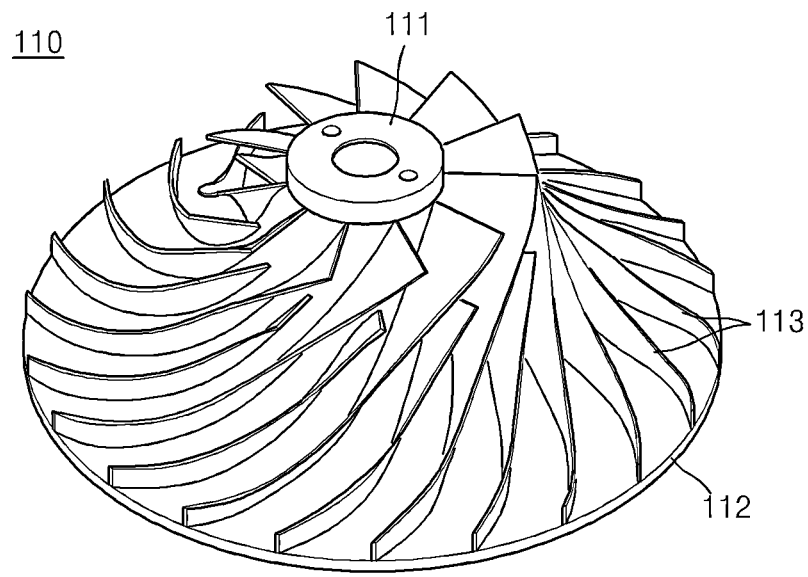
FIG. 2 is a perspective view for explaining a process of processing an impeller to manufacture the impeller assembly of FIG. 1 according to an exemplary embodiment.

FIG. 2 is a perspective view for explaining a process of processing an impeller to manufacture the impeller assembly 100 of FIG. 1 according to an exemplary embodiment.

The impeller assembly 100 is manufactured by processing the impeller 110 as illustrated in FIG. 2 and forming the shroud 120 in the impeller 110.

Referring to FIGS. 1 and 2, the impeller 110 includes a rotary shaft 111; a base portion 112 that is formed at an outer side of the rotary shaft 111, the external diameter of which increases along an extending direction of the rotary shaft 111, and that extends outward in a circumferential and radial direction; and a plurality of blades 113 disposed on the base portion 112 to be apart from one another by a predetermined interval in the circumferential direction and extending radially outward from the base portion 112.

The base portion 112 may be joined on the outer side of the rotary shaft 111, and have an external diameter that increases along the extending direction of the rotary shaft 111 as shown in FIG. 1. A surface of the base portion 112 is designed to be a concavely inclined curved surface and to form a bottom surface 112a of a fluid passage so that not only a fluid may smoothly flow but also a maximum amount of energy may be delivered to the fluid.

The plurality of blades 113 are disposed on the base portion 112 to guide the movement of a fluid and to deliver the motion energy of the impeller 110 to the fluid.

The plurality of blades 113 may be extending outwardly from the rotary shaft 111 in a radial direction to be apart from one another by a predetermined interval in the circumferential direction around the rotary shaft 111, and may be arranged on the base portion 112 to extend in a substantially radial direction (i.e. from the bottom surface 112a of the fluid passage). When the plurality of blades 113 rotate, a fluid flowing into the impeller assembly 100 via an inlet 100a is compressed by a centrifugal force and is then discharged to the outside via an outlet 100b as shown in FIG. 1.

The shroud 120 may have a hollow cone shape, the upper end of which opens to form the inlet 100a of a fluid and that expands radially along external circumferences of the plurality of blades 113 from the open upper end to a lower end. The shroud 120 forms a ceiling surface of a fluid passage, and form a moving path of a fluid together with the base portion 112 and the plurality of blades 113.

The shroud 120 extends outward from the rotary shaft 111 in the circumferential and radial direction and is disposed to cover upper portions of the plurality of blades 113. Thus, when the shroud 120 and the impeller 110 are assembled together, the upper portions of the plurality of blades 113 are covered by the shroud 120 and thus the impeller assembly 100 is completed to have an entirely closed shape so that a fluid may pass from the inlet 100a to the outlet 100b through spaces between the plurality of blades 113.

The shroud 120 is formed by melting a metal and applying the melted metal onto the plurality of blades 113. For example, the shroud 120 is formed by a laser cladding technique. A method of forming the shroud 120 will be described in detail below.

The shroud 120 may include a plurality of layers 121 and 122 covering the upper portions of the plurality of blades 113. The number of the layers 121 and 122 of the shroud 120 is not limited to an example illustrated in FIG. 2. For example, the shroud 120 may be embodied to have one or three or more layers.

The laser cladding technique is a technique of forming an alloy of different types of raw materials, such as powder, foil, wire, etc., on a surface of a metal by laser energy or growing and stacking metal layers. When the laser cladding technique is used, the lifespan of a product may increases and the thickness of a metal to be grown may be controlled precisely and freely. Thus, the laser cladding technique is applicable to both larger-sized products and smaller-sized products. Also, when the laser cladding technique is used, the degree of thermal deformation is low, a coupling ratio between a filler material and a metal surface is high, and a cladding layer (overlay layer) may be easily formed in a desired shape.

In the impeller assembly 100 having the structure described above, the shroud 120 is formed by applying a melted metal onto the plurality of blades 113 of the impeller 110 without need of joining the shroud 120 and the impeller 110 by welding. Thus, the impeller assembly 100 may be manufactured using a simple assembly process and have a firm and stable structure.

A process of compressing a fluid by a rotational movement of the impeller assembly 100 will now be described with reference to FIG. 1. When the rotary shaft 111 rotates, the impeller 110 and the shroud 120 rotate together with the rotary shaft 111.

A fluid flowing into the impeller assembly 100 via the inlet 100a is compressed in a high-pressure state by a centrifugal force generated by rotational motion energy of the impeller assembly 100 and is then discharged to the outside via the outlet 100b. The speed of the fluid discharged from the impeller assembly 100 via the outlet 100b may decrease when the fluid passes through, for example, a diffuser (not shown), and at the same time, the pressure of the fluid may increase to a desired level.

Figure 3:
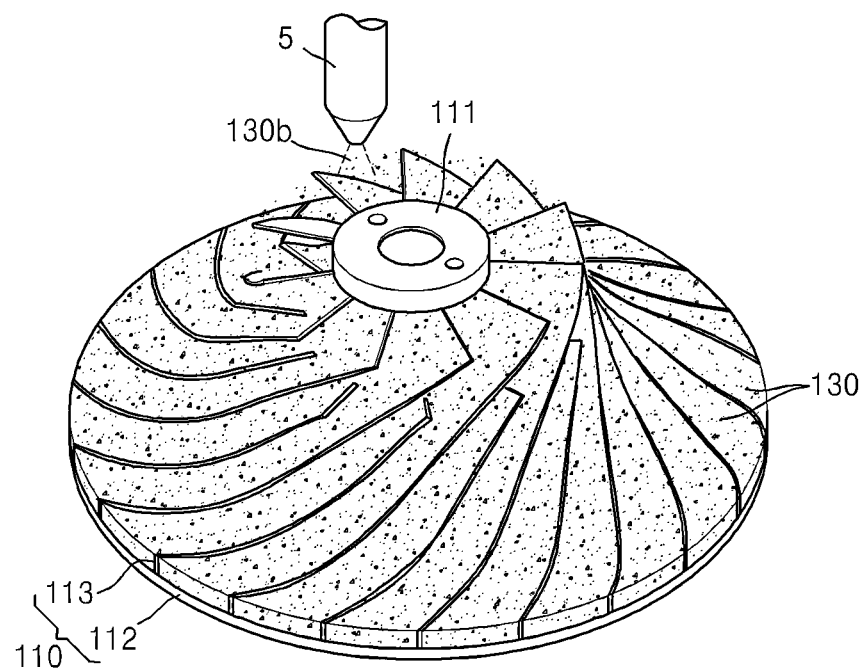
FIG. 3 is a perspective view for explaining a process of filling the impeller of FIG. 2 with a mold according to an exemplary embodiment.
Figure 4:
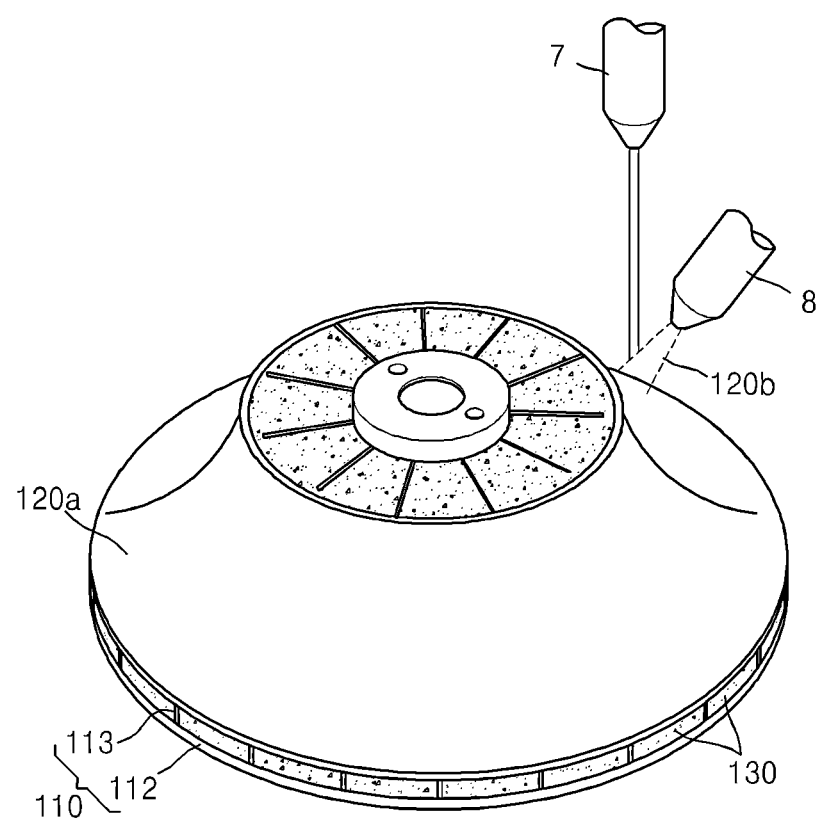
FIG. 4 is a perspective view for explaining a process of forming a shroud in the impeller of FIG. 3 according to an exemplary embodiment.

FIG. 3 is a perspective view for explaining a process of filling an impeller 110 of FIG. 2 with a mold according to an exemplary embodiment. FIG. 4 is a perspective view for explaining a process of forming a shroud 120 in the impeller 110 of FIG. 3 according to an exemplary embodiment. FIG. 5 is a schematic flowchart of a method of manufacturing an impeller assembly according to an exemplary embodiment.

The method of manufacturing an impeller assembly of FIG. 5 according to an exemplary embodiment includes providing an impeller including blades (operation S110), providing a mold in an area 113b (FIG. 7) between the blades (operation S120), forming a shroud by applying a melted metal thereon (operation S130), and removing the mold (operation S150).

In the providing the impeller (operation S110), the impeller 110 illustrated in FIG. 2 may be prepared. That is, referring to FIG. 2, in the providing the impeller (operation S110), the impeller 110 is prepared by providing the plurality of blades 113 on the base portion 112.

Figure 7:
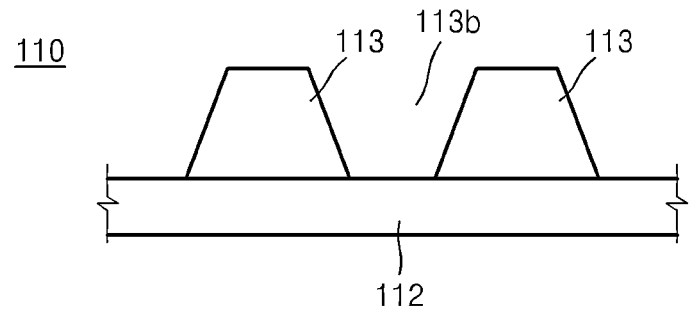
FIG. 7 is a side view of an impeller completed using the process of FIG. 6 according to an exemplary embodiment.

FIG. 6 is a side view for schematically explaining the preparing of the impeller, which is included in the method of manufacturing an impeller assembly of FIG. 5. FIG. 7 is a side view of an impeller completed using the process of FIG. 6.

FIGS. 6 and 7 illustrate an example of a process of preparing the impeller 110, in which a three-dimensional (3D) printing process is performed to form the plurality of blades 113 by repeatedly applying a layer 113a onto the base portion 112. The 3D printing process is a method of forming a 3D structure by applying, for example, a metal material or resin on the base portion 112 by using a spray nozzle 3.

However, a method of disposing the plurality of blades 113 on the base portion 112 is not limited to the 3D printing process. For example, a disk type base portion 112 may be processed and then the plurality of blades 113 may be disposed on the base portion 112 using a welding process or the like. Also, during the manufacture of the impeller 110, a metal processing method may be used to form the base portion 112 on which the plurality of blades 113 are formed by performing metal processing by cutting (e.g., machining) a metal base material. Also, the impeller 110 may be manufactured by precise casting with both the base portion 112 and the plurality of blades 113.

The plurality of blades 113 and the base portion 112 may be formed of light carbon steel, a non-ferrous metal such as aluminum, or high-stiff plastic.

Figure 8:
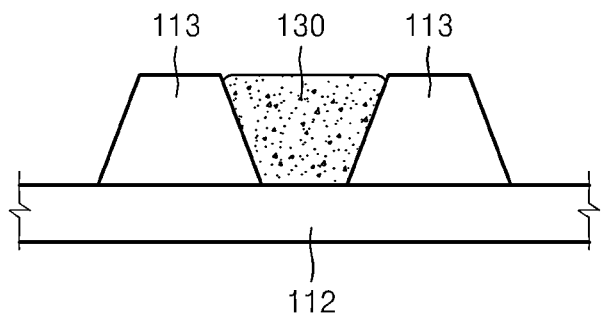
FIG. 8 is a side view for explaining a process of filling the impeller of FIG. 7 with a mold according to an exemplary embodiment.

FIG. 8 is a side view for explaining a process of filling the impeller of FIG. 7 with a mold according to an embodiment of the present invention.

FIG. 8 schematically illustrates a state in which a mold 130 is disposed in an area 113b between the plurality of blades 113. In FIG. 8, the mold 130 may be formed by filling spaces between the plurality of blades 113 with a filling material 130b that may be a paste formed of a ceramic material by using a filling nozzle 5 as illustrated in FIG. 3. The filling material 130b may be a paste type material but in the present disclosure, the term 'paste' may be understood as including not only dried powder containing no liquid but also a gel type material containing a liquid.

The ceramic material may be a material, e.g., plaster or gypsum, which is temporarily hardened and can be broken by shock or vibration.

The filling material 130b may be hardened after the area 113b between the plurality of blades 113 are filled with the filling material 130b. The mold 130 having a shape illustrated in FIG. 8 is completed by hardening the filling material 130b. The mold 130 extends radially outward from the rotary shaft 111 in a direction in which the plurality of blades 113 extend, and has a shape corresponding to the area 113b between adjacent blades 113. Thus, the mold 130 enables to firmly maintain the intervals between the plurality of blades 113, thereby minimizing a change in the shape or location of the plurality of blades 113 during subsequent processes.

As shown in FIG. 6, the plurality of blades 113 may be formed such that widths along the circumferential direction around the rotary shaft 111 thereof become decreased from a contacting portion of the plurality of blades 113 and the base portion 112 toward an end portion of the plurality of blades 113 which contact the shroud 120. Also, the width of the mold 130 along the circumferential direction around the rotary shaft 111 filled in the area 113b between the plurality of blades 113 may become increased from a contacting portion of the mold 130 and the base portion 112 toward an end portion the mold 130 which contact the shroud 120.

As described above, the widths of the plurality of blades 113 and the mold 130 may be set to change from the base portion 112 toward the end portions of the plurality of blades 113 and the mold 130, thereby stably maintaining an assembled state in which the mold 130 is disposed between adjacent blades 113. Thus, the location of the plurality of blades 113 may be firmly maintained, and the shroud 120 and the plurality of blades 113 may thus be precisely and stably joined during a process of forming the shroud 120 which will be described below.

The providing the mold 130 between the plurality of blades 113 is not limited to a method of filling the areas 113b between the plurality of blades 113 with the filling material 130b formed of the ceramic material paste illustrated in FIG. 3. That is, the providing of the mold 130 between the plurality of blades 113 may be performed by forming, for example, a mold having a shape corresponding to the areas 113b between adjacent plurality of blades 113 and inserting the formed mold between the areas 113b between the plurality of blades 113.

Figure 9:
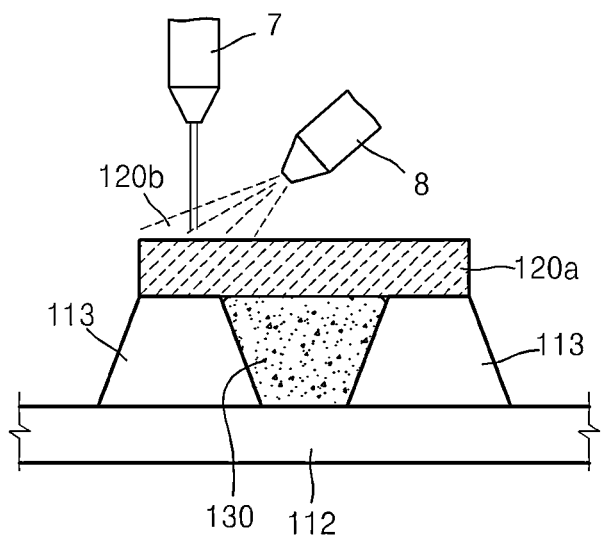
FIG. 9 is a side view for explaining a process of forming a shroud in the impeller of FIG. 8 according to an exemplary embodiment.
Figure 10:
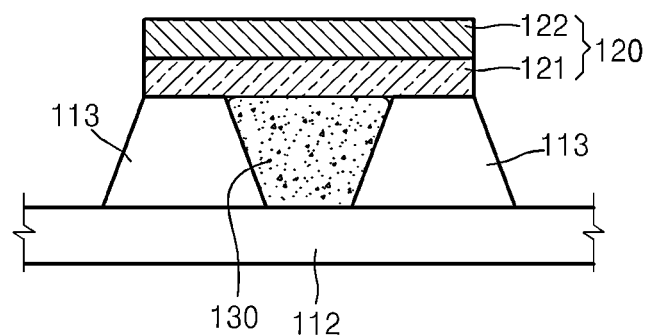
FIG. 10 is a side view of a state in which the shroud is formed in the impeller of FIG. 9 according to an exemplary embodiment.

FIG. 9 is a side view for explaining a process of forming a shroud in the impeller of FIG. 8 according to an exemplary embodiment. FIG. 10 is a side view of a state in which the shroud is formed in the impeller of FIG. 9.

After the mold 130 is disposed between the plurality of blades 113, the shroud 120 may be formed as illustrated in FIGS. 4, 9, and 10. The shroud 120 may be formed by applying metal powder 120b using a metal spray nozzle 8 onto upper surfaces of the plurality of blades 113 and the mold 130 and melting the metal powder 120b by irradiating laser onto the metal powder 120b by using a laser 7 via the laser cladding technique as shown in FIGS. 4 and 9.

The laser cladding technique is a technique of forming an alloy of different types of raw materials 120b, such as powder, foil, wire, etc., on a surface of a metal 120a by laser energy or growing and stacking metal layers. The laser cladding technique is an example of a laser surface modification method of forming a new cladding layer having a totally different chemical composition from that of the metal and a fine structure on a surface of the metal by instantly generating a melt pool by irradiating high-output laser beams onto a surface of the metal and at the same time, supplying a power type cladding material (metal, an alloy, ceramic, etc.) to the surface of the metal from the outside.

When the laser cladding technique is used, the lifespan of a product may be increased and the thickness of a metal to be grown may be controlled. Thus, the laser cladding technique is applicable to both larger-sized products and smaller-sized products. Also, when the laser cladding technique is used, the degree of thermal deformation is low, a coupling ratio between a filling melting and a metal surface is high, and a cladding layer (overlay layer) may be formed in a desired shape.

The forming of the shroud 120 is not limited to the laser cladding technique, and the shroud 120 may be formed by melting a metal in a separate process and applying the melted metal on upper surfaces of the plurality of blades 113 and an upper surface of the mold 130.

The shroud 120 may include a plurality of layers 121 and 122 as illustrated in FIG. 10. In an exemplary embodiment of FIG. 10, the shroud 120 includes two layers 121 and 122, but the exemplary embodiment is not limited thereto and the shroud 120 may include only one layer or three or more layers.

Figure 11:
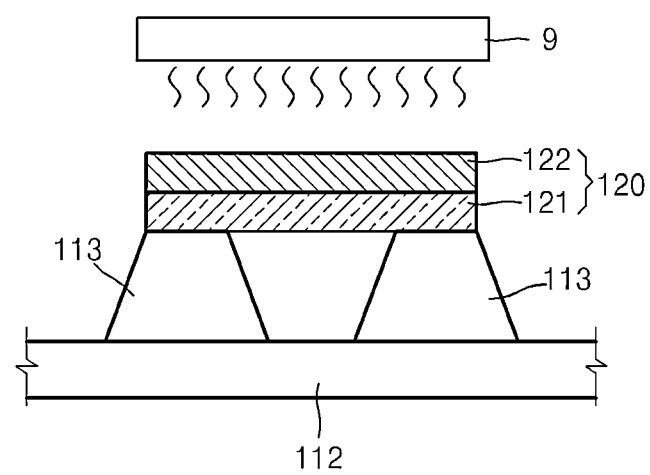
FIG. 11 is a side view for explaining a process of hardening a metal in the impeller of FIG. 10 according to an exemplary embodiment.

FIG. 11 is a side view for explaining a process of hardening a metal in the impeller of FIG. 10 according to an exemplary embodiment.

After the metal layer is applied to form the shroud 120, the metal layer may be hardened by applying heat thereto using a heating machine 9. After the metal layer is hardened, a finish grinding process may be further performed to precisely grind a surface of the shroud 120.

When the method of manufacturing an impeller assembly which includes the operations described above is used, the shroud 120 needs not be joined with upper portions of the plurality of blades 113 of the impeller 110 by welding, thereby simplifying a process of manufacturing the impeller assembly 100 including the shroud 120.

Also, if the impeller assembly 100 is manufactured even in a large-size, a structure in which the shroud 120 is firmly united with the upper portions of the plurality of blades 113 may be obtained. Thus, the entire impeller assembly 100 has a firm and stable structure compared to a method of the related art using welding or the like. Also, the number and thickness of the plurality of layers 121 and 122 that constitute the shroud 120 may be freely and precisely determined according to the size of the impeller assembly 100, thereby enabling to easily design and manufacture the impeller assembly 100.

The mold 130 disposed between the plurality of blades 113 may be removed after the shroud 120 is hardened but exemplary embodiments are not limited thereto. That is, the mold 130 may be removed before the shroud 120 is hardened.

The removing of the mold 130 may include grinding the mold 130, for example, by applying ultrasonic vibration to the entire impeller assembly 100 to deliver the ultrasonic vibration to the mold 130, and cleaning the grinded mold 130. The grinded mold 130 may be cleaned by spraying high-pressure water or high-pressure air thereto.

Alternatively, the moving of the mold 130 may include grinding the mold 130, for example, by spraying high-pressure water or air onto the mold 130 or irradiating laser beams onto the mold 130, and cleaning the grinded mold 130.

The removing of the mold 130 is not an indispensable operation when the impeller assembly 100 is manufactured, and the completed impeller assembly 100 may be packed and placed on the market in a state in which the mold 130 is included therein.

In this case, the impeller assembly 100 may be delivered in a state in which the mold 130 is disposed between the plurality of blades 113 of the impeller assembly 100, thereby minimizing damage to the plurality of blades 113 caused by shocks during delivery of the impeller assembly 100. If the impeller assembly 100 is put on the market in a state in which the mold 130 is disposed between the plurality of blades 113 of the impeller assembly 100, the impeller assembly 100 may be installed in a fluid rotary machine after the mold 130 is removed.

Figure 12:
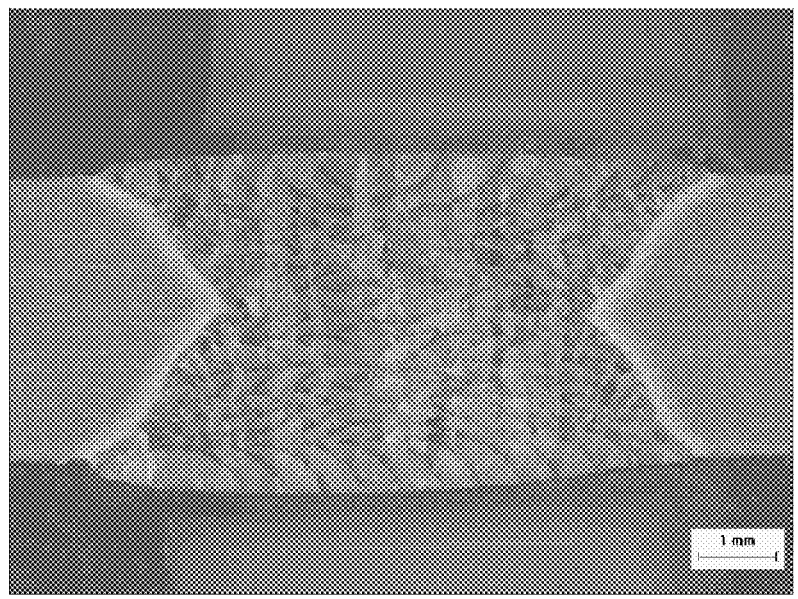
FIG. 12 is a photo of a cross section of the texture of the shroud formed in the impeller of FIG. 10 according to an exemplary embodiment.
Figure 13:
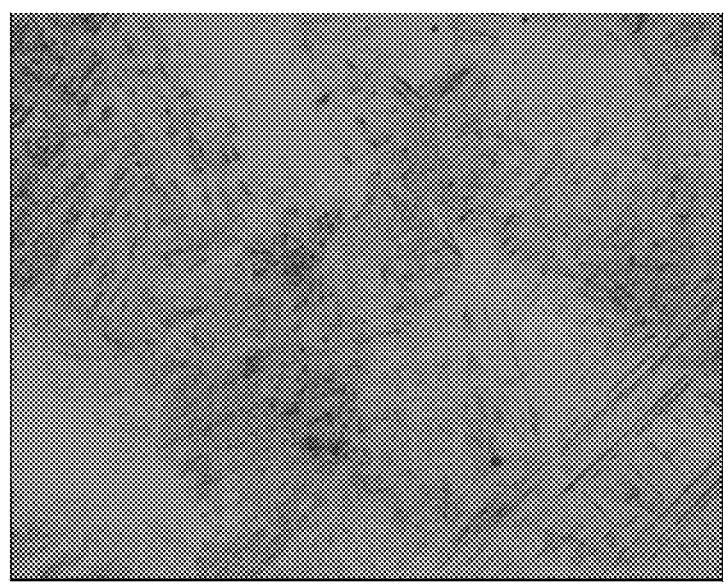
FIG. 13 is a photo of an enlarged portion of the cross section of the texture of the shroud of FIG. 12 according to an exemplary embodiment.
Figure 14:
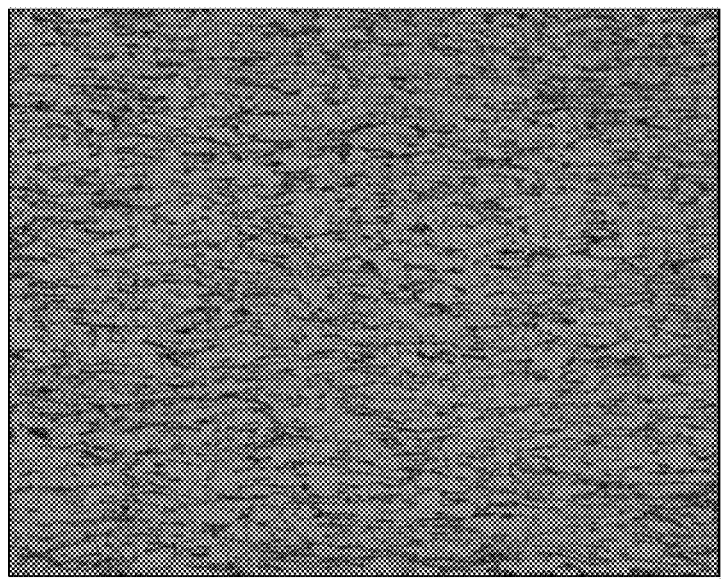
FIG. 14 is a photo of an enlarged portion of the cross section of the texture of a metal of the related art.

FIG. 12 is a photo of a cross section of the texture of the shroud 120 formed in the impeller of FIG. 10 according to an exemplary embodiment. FIG. 13 is a photo of an enlarged portion of the cross section of the texture of the shroud 120 of FIG. 12. FIG. 14 is a photo of an enlarged portion of the cross section of the texture of a metal of the related art.

The cross sections of the textures illustrated in FIGS. 12 and 13 are examples when the shroud 120 is formed using the laser cladding technique. When the laser cladding technique is used, different types of metals may be easily and firmly united with each to other. In this case, metal powder melted by laser may be strongly united with a base material, and thus the different types of metals may be more firmly combined at the united portions of the melted metal power and the base material, thereby improving the mechanical performance such as corrosion resistance of the impeller assembly as illustrated in FIG. 13, compared to the cross section of the texture of a metal of the related art as illustrated in FIG. 14.

As described above, according to the exemplary embodiments, in an impeller assembly 100 of a fluid rotary machine and a method of manufacturing the same, a shroud 120 needs not be united with upper portions of blades 113 of an impeller 110 by welding and is formed by applying a melted metal, thereby simplifying the method of manufacturing the impeller assembly 100.

Also, even if a large-sized impeller assembly 100 is manufactured, a structure in which a shroud 120 is firmly united with upper portions of blades 113 may be obtained, and the entire impeller assembly 100 has a firm and stable structure, compared to a method of the related art using welding or the like.

Also, the number and thickness of layers that are to form a shroud 120 may be freely determined according to the size of an impeller assembly 100, thereby enabling to easily and simply design and manufacture the impeller assembly 100.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

While exemplary embodiments have been particularly shown and described above, it would be understood by those of ordinary skill in the art that various changes may be made therein without departing from the spirit and scope of the inventive concept as defined by the following claims.

What is claimed is:

1. A method of manufacturing an impeller assembly, the method comprising:
    providing an impeller comprising:
        a rotary shaft;
        a base portion radially extending outward from the rotary shaft; and
        a plurality of blades extending radially outward from the rotary shaft and disposed on the base portion, each of the plurality of blades provided apart from one another in a circumferential direction around the rotary shaft;
    providing a mold in an area between the plurality of blades; and
    forming a shroud covering upper portions of the plurality of blades and an upper portion of the mold, the shroud having a first surface and a second surface opposite to the first surface,
    wherein the forming the shroud comprises applying a melted metal on the upper portions of the plurality of blades and the upper portion of the mold to generate an entirety of the shroud extending from the first surface to the second surface, the first surface contacting the upper portions of the plurality of blades and the second surface corresponding to a top surface of the impeller assembly.

2. The method of claim 1, wherein the forming the shroud comprises:
    supplying metal powder to the upper portions of the plurality of blades and the upper portion of the mold; and
    irradiating laser onto the metal powder to melt the metal powder.

3. The method of claim 1, wherein the forming the shroud comprises:
    melting a metal;
    applying the melted metal onto the upper portions of the plurality of blades and the upper portion of the mold; and
    hardening the applied metal.

4. The method of claim 1 further comprising forming the shroud with at least two layers.

5. The method of claim 1, wherein the providing the impeller comprises performing three-dimensional (3D) printing the plurality of blades.

6. The method of claim 5, wherein the performing 3D printing comprises repeatedly stacking a plurality of layers on the base portion.

7. The method of claim 1, wherein widths of the plurality of blades decrease from a contacting portion of the plurality of blades and the base portion toward an end portion of the plurality of blades.

8. The method of claim 7, wherein the mold is provided between adjacent blades, and wherein a width of the mold increases from a contacting portion of the mold and the base portion toward an end portion of the mold.

9. The method of claim 1, wherein the providing the mold between the plurality of blades comprises filling spaces between adjacent blades with a ceramic material paste.

10. The method of claim 9, wherein the providing the mold between the plurality of blades further comprises hardening the mold after the mold is provided between the plurality of blades.

11. The method of claim 1, wherein the providing the mold between the plurality of blades comprises inserting a pre-manufactured mold having a shape corresponding to spaces between adjacent blades.

12. The method of claim 1, further comprising removing the mold.

13. The method of claim 12, wherein the removing the mold comprises at least one of grinding the mold, delivering ultrasonic vibration to the mold, spraying high-pressure water onto the mold, and irradiating laser beams onto the mold.

14. The method of claim 1, wherein the forming the shroud comprises spraying the melted metal on the upper portions of the plurality of blades and the upper portion of the mold.

* * * * *